UNITED STATES PATENT OFFICE.

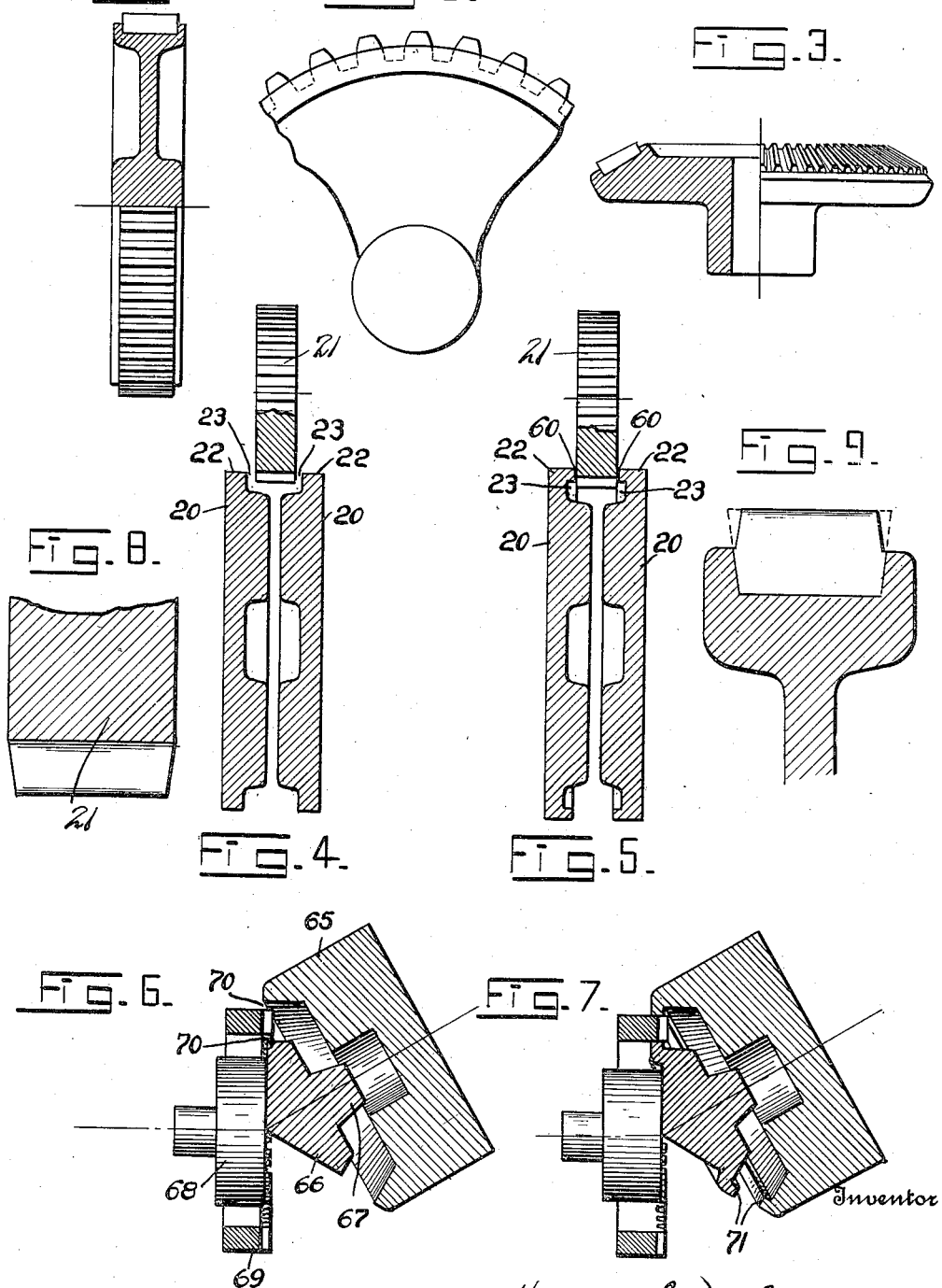

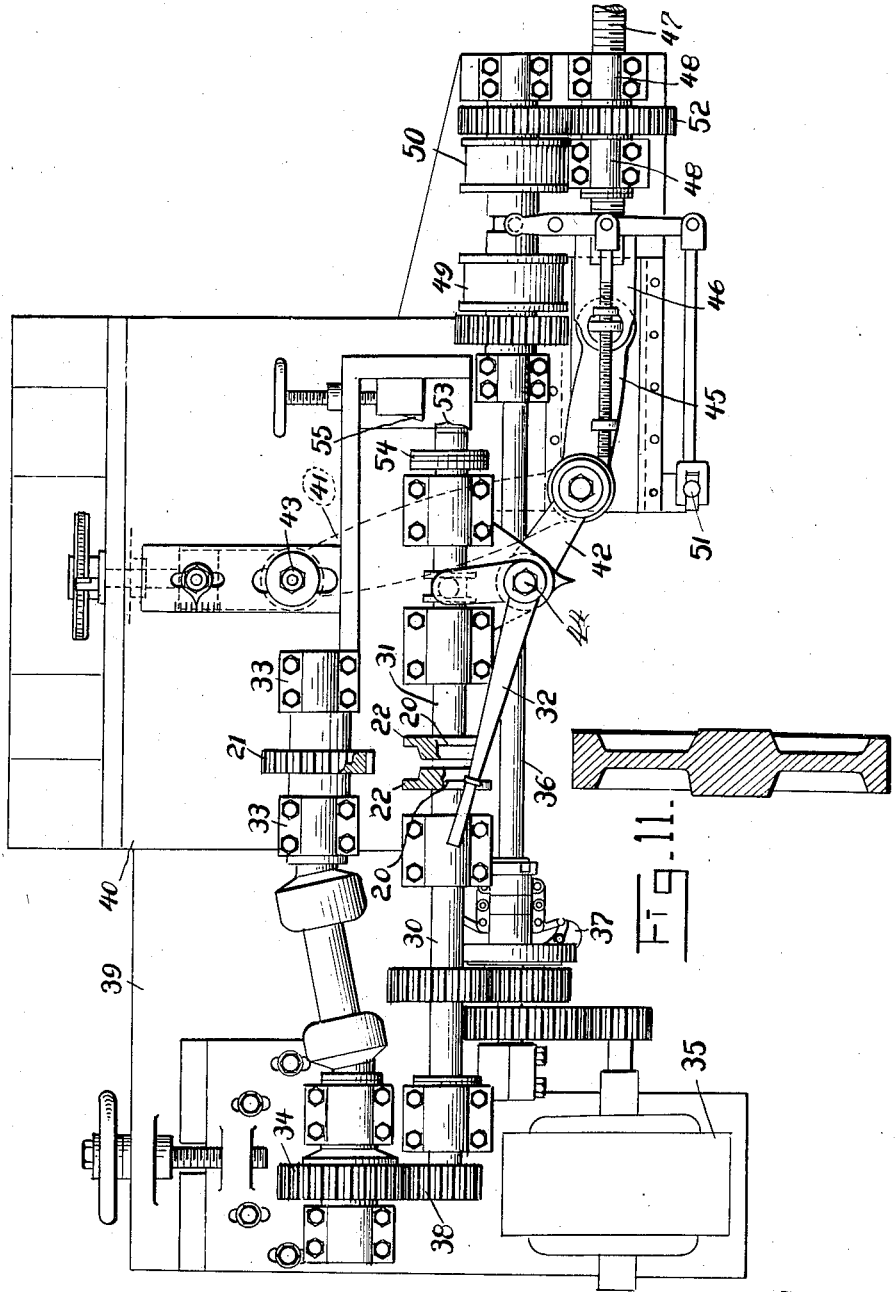

HAROLD N. ANDERSON, OF CLEVELAND, OHIO, ASSIGNOR TO THE ANDERSON PATENTS COMPANY, OF CLEVELAND, OHIO, A CORPORATION OF OHIO.

METHOD OF MAKING GEARS.

1,377,177.  Specification of Letters Patent.  Patented May 10, 1921.

Application filed December 18, 1917, Serial No. 207,649. Renewed January 13, 1921. Serial No. 437,126.

*To all whom it may concern:*

Be it known that I, HAROLD N. ANDERSON, a citizen of the United States, residing at Cleveland, Cuyahoga county, Ohio, have invented certain new and useful Improvements in Methods of Making Gears, of which the following is a full, clear, and exact description.

My invention relates to shrouded gears composed of forged metal as distinguished from cast metal. Shrouded gears are well known in the mechanical art and are extensively used in certain classes of machinery because of their great strength. Their use has heretofore been restricted, however, because of there being no way to make them, other than to cast them. Inasmuch as cast gears cannot be made very accurate, nor can their surfaces be made smooth and uniform, the use of shrouded gears has practically been limited to what is ordinarily classed as rough machinery.

In my several United States patents, among which are Nos. 1,001,799; 1,240,913; 1,240,914; 1,240,915; 1,240,916; 1,240,917 and 1,240,918, I have disclosed various machines for making gears by rolling a toothed die against a heated blank. By this means I have made spur and bevel gears; also herring bone gears. My present invention is a method of making shrouded gears by the rolling process. As a result of the rolling the metal in the teeth is very compact and free from flaws; it is in fact what is known as mechanically refined. This mechanical refinement removes most of the "blow holes" and other imperfections, and those which are not removed are flattened and orientated in such a way as to be rendered innocuous. The metal is also hardened to a greater or less extent by the action of the die, and its wearing qualities very much improved. Because of the heated condition of the blank at the time the teeth are being formed the finished gear is practically free from internal stresses which would tend to distort it if subjected to heat treatment.

In the accompanying drawings,—

Figure 1 is a face view of a shrouded spur gear, partly in section.

Fig. 2 is a side view of a fragment of a shrouded spur gear.

Fig. 3 is a side view of a shrouded bevel gear.

Fig. 4 is a sectional view of a holder for spur gear blanks.

Fig. 5 is a sectional view of a modified form of holder for spur gears.

Fig. 6 is a sectional view of a holder for bevel gears.

Fig. 7 is a sectional view of a modified form of holder for bevel gears, the modificaation resembling the modification shown in Fig. 5.

Fig. 8 shows a fragment of a die, illustrating the beveling of the teeth to facilitate its withdrawal from the blank.

Fig. 9 shows a fragment of a gear, illustrating the effect on the gear of beveling the die teeth.

Fig. 10 is a gear rolling machine.

Fig. 11 shows a sectional view of a blank from which to roll a spur gear.

The operation of rolling gears is briefly this: A heated blank is inserted in a rotatable support or holder, and the holder rotated. A rotating toothed roll is then pressed against the heated blank, the holder and roll being gradually brought closer together, causing the teeth of the toothed roll or die to sink into the metal of the blank and form teeth conjugate to its own teeth. The original diameter of the blank may be about equal to the pitch-diameter of the gear to be made from it, the metal displaced by the die to form the dedenda of the teeth about equaling the metal necessary to form the addenda. I have found that confining the metal at the sides of the tooth-receiving zone of the blank aids materially in the formation of the teeth and improves the quality of the metal of which they are composed. I at first confined the metal closely, making no provision for excess material. This, however, necessitates the blanks containing just the correct amount of metal. If the blank has too little metal the teeth will not be filled out. If there is too much metal, the excess, having no outlet, is carried around the blank by the die; it flows ahead of the die, so to speak, and inequality or other imperfections in the teeth may result. After long and costly experimentation I have found that a restricted outlet for the metal is not inimical to the process. I have found that limited spaces at the sides of the tooth-receiving zone of the blank, into which the metal can flow, with provision for escape from the spaces of excess material, affords all of the advantages of confinement of the metal, while eliminating the practical difficulties of closely confining it. Thus the problem of uniformity and precision in the blanks was solved, and what is more important I have discovered a new method of making shrouded gears.

In Fig. 4 is illustrated, rather diagrammatically, the preferred form of blank-holder. This holder comprises the disks 20—20 between which the blank is clamped. The disks are preferably formed complementary to the contour of the blank, so that they fully support the blank. The die-roll 21 is shown in the position it occupies at the time the rolling of the blank is completed. The disks have extensions 22 between which the die operates, but the distance between the extensions is sufficient to leave a space 23 at each side of the die. It is more or less immaterial what proportions the blank has in the beginning, provided it contains sufficient material. If its face is as broad as the distance between the extensions 22 its diameter need be but little greater than the pitch-diameter of the gear to be made. If the face of the blank is narrower than the distance between the extensions its diameter must be correspondingly greater. As long as the metal is free to flow laterally there is a possibility that the teeth may not be quite filled out; remote corners of the teeth are liable to be slightly rounded where they should be sharp. But when the lateral flow of the metal is arrested by the extensions 22 it is forced into the most remote or inaccessible interstices of the die and the teeth are perfectly formed. Continued movement of approach between the die and blank, if the movement be continued after the teeth are fully filled out, then forces more metal into the spaces 23, and since its lateral flow is limited by the extensions 22 it is compelled to flow toward the openings at the perimeters of the spaces. These openings afford sufficient outlet for excess metal to obviate the difficulty before mentioned of the excess metal flowing ahead of the die. On the other hand the metal is sufficiently confined to insure perfect filling out of the teeth. The metal which has flowed into or was in the beginning in the spaces 23 forms continuous ribs or bands integral with the body of the blank and uniting all of the teeth. These are known as shrouds. If the shrouds are to be retained the spaces 23 should be as wide as the shrouds are intended to be, unless the shrouds are to be turned or otherwise finished, in which case the spaces may be made correspondingly wider. The shrouds on the gears shown in Figs. 1 and 3 are of about the usual proportions. If the shrouds are not to be retained the spaces 23 may be made considerably narrower than those shown and yet function as outlets for excess metal. The narrow ribs or bonds may then be removed in a lathe. While shrouds may, and frequently do, extend to the ends of the teeth they cannot be permitted to do so where two shrouded gears run together. Where shrouded gears are run together the shrouds may not extend outside of the pitch circle, as is well understood by those who use shrouded gears.

In Fig. 10 I show the blank-holder and die-roll mounted in a gear rolling machine. One of the disks 20 is rigidly secured on the end of the shaft 30, and the other is secured to the end of shaft 31, this shaft being movable endwise to let in the blank by means of the lever 32. The die-roll is mounted on a shaft journaled in bearings 33—33, which is driven through universal joints by a gear 34. A motor 35 is arranged to constantly rotate shaft 36, and by means of a clutch 37 and train of gears drives shaft 30, a gear 38 on the end of shaft 30 driving gear 34. All of the mechanism so far mentioned, except the bearings 33—33, is mounted on the base 39. Bearings 33 are mounted on a table 40 arranged to slide transversely with reference to the shafts on the base. A toggle composed of links 41 and 42, the former pivoted at 43 to the table 40, the latter pivoted at 44 to the base 39, is connected by a link 45 and cross head 46 to the screw 47, which is mounted to slide but not rotate in bearings 48—48. By means of clutches 49 and 50, controlled by a vertical lever 51, the gear 52 may be rotated in either direction by the shaft 36. The hub of this gear is threaded to fit the screw and being confined between the bearings 48—48 rotation of the gear moves the screw endwise in one direction or the other, according to the direction of rotation of gear 52. Movement of the screw to the left, as seen in the drawing, brings the links of the toggle into parallelism and draws the table 40 toward the shaft 30, thereby pressing the rotating die into the blank. At its right hand end the shaft 31 carries a cam or ramp 53 which is connected to the shaft through a ball thrust bearing 54, the ramp being kept from rotating by means not seen in this view. Mounted on the table 40 is a lug 55 which is adapted to engage the ramp before the die reaches the blank and by forcing the shaft 31 endwise clamp the blank firmly between the disks 20—20, the ramp 53 and lug 55 continuing in engagement while the rolling operation continues. Other views of this machine and a more extended description may be found in my Patent No. 1,240,915, issued September 25, 1917.

In Fig. 5 I show a modification, wherein there is no perimetrical opening, the inwardly turned flanges 60—60 on the extensions 22—22 approaching so close to each other as to leave just room enough for the die between them.

In Fig. 6 I show an arrangement for rolling bevel shrouded gears. The apparatus here shown is intended to be used on a machine similar to the one shown in my patent No. 1,240,916, and comprises a holder 65, mounted on a rotatable shaft (not shown), recessed to receive the blank. A conical block 66 is adapted to set on the blank and is provided with a dowel 67 to enter a hole in the center of the blank. The block is pressed against the blank and the blank thus clamped in the holder by a circular, flat faced, block 68, which is mounted on the end of a rotatable longitudinally movable plunger (not shown). The die 69 consists of a crown gear cut on the end of a cylindrical ring, which is mounted and moved longitudinally by means not shown. The die is shown in the position it occupies at the termination of the tooth forming operation and it is seen that its teeth operate between elements which limit the lateral flow of metal just as has been described in connection with Fig. 4. That is, there are spaces 70 at the sides of the tooth receiving zone of the blank, which spaces have perimetrical openings similar to those in Fig. 4. A bevel gear made in this kind of a holder is shown in Fig. 3.

Although very different in construction and operation, and designed to produce quite different articles, the structures illustrated in Figs. 4 and 6 embody the same broad principle; that of imposing a limited pressure on the material worked upon, and permitting transfusion of material according to the relative pressure in the tooth-receiving zone and the zones comprising the spaces 23. The metal is sufficiently confined to force it into the most remote parts of the die but the confinement is not positive. It is only relative. It requires a given pressure to force the metal into remote interstices of the die; it requires a much greater pressure to force the metal to flow ahead of the die. Confining the metal by providing an indirect outlet produces sufficient pressure for the former but insufficient pressure for the latter effect.

In Fig. 7 the holder and conical block are provided with flanges 71 which close the perimetrical opening as has been described in connection with Fig. 5.

In Fig. 8, which illustrates a fragment of a spur gear die, the teeth are beveled to give them draft, facilitating their withdrawal from the blank during the rolling operation. Fig. 9 shows the effect of this on the blank. In dotted lines the shape of the tooth as it comes from the holder is shown, it being understood that the shrouds will also extend out farther than shown in the figure. The shrouds are turned down to the pitch-line and the teeth are beveled from the pitch-line outward so as to permit their entrance into the mating gear, which is supposed to have also been formed with a beveled die-roll. In order to provide clearance and allow for a little side play of the gears the addenda of the teeth are made slightly narrower than the space they enter in the mating gear.

It is to be understood that my invention is not limited in its application to the specific embodiments illustrated. It is only limited by the scope of the appended claims.

What I claim is as follows:

1. The method of rolling gear teeth on a blank by means of a toothed die, which consists in subjecting the tooth-receiving zone of the blank to rolling contact with the die at invariable relative velocity with a contemporaneous movement of approach between the blank and die, while permitting a limited lateral flow of the material composing the blank.

2. The method of rolling gear teeth on a blank by means of a toothed die, which consists in subjecting the tooth-receiving zone of the blank to rolling contact with the die at invariable relative velocity with a contemporaneous movement of approach between the blank and die, while permitting a limited flow of the material to non-tooth-receiving zones of the blank.

3. The method of rolling gear teeth on a blank by means of a toothed die, which consists in subjecting the tooth-receiving zone of the blank to rolling contact with the die at invariable relative velocity with a contemporaneous movement of approach between the blank and die, while subjecting the metal to a limited pressure.

4. The method of rolling gear teeth on a blank by means of a toothed die, which consists in subjecting the tooth-receiving zone of the blank to rolling contact with the die at invariable relative velocity with a contemporaneous movement of approach between the blank and die, permitting flow of the metal in an area comprising the tooth-receiving zone and predetermined zones on each side thereof.

5. The method of rolling gear teeth on a blank by means of a toothed die, which consists in subjecting the tooth-receiving zone of the blank to rolling contact with the die with a contemporaneous movement of approach between the blank and die, permitting flow of the metal in an area comprising the tooth-receiving zone and predetermined zones on each side thereof, and allowing excess metal to escape from said side zones before the pressure becomes so great as to distort the tooth-receiving zone.

6. The method of rolling gear teeth on a blank by means of a toothed die, which consists in subjecting the tooth-receiving zone of the blank to rolling contact with the die with a contemporaneous movement of approach between the blank and die, permitting flow of the metal in an area comprising the tooth-receiving zone and predetermined zones on each side thereof, and allowing excess metal to escape in the direction of the axis of the die before the pressure becomes so great as to distort the tooth-receiving zone.

7. The method of rolling gear teeth on a blank by means of a toothed die, which consists in subjecting the tooth-receiving zone of the blank to rolling contact with the die at invariable relative velocity with a contemporaneous movement of approach between the blank and die, permitting flow of the metal in the tooth-receiving zone of the blank and in zones on each side thereof the metal in said side zones being allowed to form continuous bands which unite the teeth.

8. The method of rolling gear teeth on a blank by means of a toothed die, which consists in subjecting the tooth-receiving zone of the blank to rolling contact with the die with a contemporaneous movement of approach between the blank and die, confining the metal to an area comprising the tooth-receiving zone and limited zones at each side thereof but allowing excess metal to escape at the sides of the die, flowing toward the axis of the die.

9. The method of rolling gear teeth on a blank by means of a toothed die, which consists in subjecting the tooth-receiving zone of the blank to rolling contact with the die at invariable relative velocity with a contemporaneous movement of approach between the blank and die, confining the metal to an area comprising the tooth-receiving zone and limited zones at each side thereof but permitting movement of the metal within said zones according to the relative pressures therein.

10. The method of rolling gear teeth on a blank, which consists in subjecting the tooth-receiving zone of the blank to rolling contact with a die at invariable relative velocity, with a contemporaneous movement of approach between the blank and die, forcing a portion of the metal of the tooth-receiving zone laterally while imposing a resistance to the escape of said metal during at least a part of the time of said approach.

11. The method of rolling gear teeth upon a blank, which consists in subjecting the tooth-receiving zone of the blank to the rolling action of a die without peripheral advance of either the blank or die, each with reference to the other, with a contemporaneous movement of approach between the blank and die, and forcing a portion of the metal of the tooth-receiving zone to flow laterally and also toward the axis of the die.

12. The method of rolling gear teeth on a blank, which consists in subjecting the tooth-receiving zone of the blank to the rolling action of a toothed die with a contemporaneous movement of approach between the blank and die, forcing a portion of the metal of the tooth-receiving zone laterally, and resisting this lateral flow of the metal so that the metal will bridge across and form continuous bands connecting the several teeth formed on the blank.

In testimony whereof I affix my signature in the presence of two subscribing witnesses.

HAROLD N. ANDERSON.

Witnesses:
R. W. TOUZEAU,
WM. BOHLEBER.